(12) United States Patent
Büttner et al.

(10) Patent No.: US 9,228,119 B2
(45) Date of Patent: Jan. 5, 2016

(54) TWO-COMPONENT SILICONE COMPOSITION

(75) Inventors: Matthias Büttner, Marktbreit (DE); Alexander Djurdjevic, Zürich (CH)

(73) Assignee: SIKA TECHNOLOGY AG, Zurich (CH)

( * ) Notice: Subject to any disclaimer, the term of this patent is extended or adjusted under 35 U.S.C. 154(b) by 58 days.

(21) Appl. No.: 13/816,122

(22) PCT Filed: Sep. 29, 2011

(86) PCT No.: PCT/EP2011/066969
§ 371 (c)(1),
(2), (4) Date: May 16, 2013

(87) PCT Pub. No.: WO2012/041952
PCT Pub. Date: Apr. 5, 2012

(65) Prior Publication Data
US 2013/0245172 A1    Sep. 19, 2013

(30) Foreign Application Priority Data

Sep. 30, 2010   (EP) .................................... 10184328

(51) Int. Cl.
| | | |
|---|---|---|
| *C09J 183/04* | (2006.01) | |
| *C08L 83/04* | (2006.01) | |
| *C08L 83/06* | (2006.01) | |
| *C09D 183/04* | (2006.01) | |
| *C08L 83/08* | (2006.01) | |
| *C08K 9/06* | (2006.01) | |
| *C08L 71/00* | (2006.01) | |
| *C08L 79/00* | (2006.01) | |

(52) U.S. Cl.
CPC ............... *C09J 183/04* (2013.01); *C08L 83/04* (2013.01); *C08L 83/06* (2013.01); *C08L 83/08* (2013.01); *C09D 183/04* (2013.01); *C08K 9/06* (2013.01); *C08L 71/00* (2013.01); *C08L 79/00* (2013.01)

(58) Field of Classification Search
CPC .............................. C09J 183/04; C09J 183/06
See application file for complete search history.

(56) References Cited

U.S. PATENT DOCUMENTS

| | | |
|---|---|---|
| 4,261,758 A | 4/1981 | Wright et al. |
| 4,323,489 A | 4/1982 | Beers |
| 2002/0143100 A1 | 10/2002 | Morimoto et al. |
| 2010/0063190 A1 | 3/2010 | Bankwitz et al. |

FOREIGN PATENT DOCUMENTS

WO    WO 2006/010764 A1    2/2006

OTHER PUBLICATIONS

Dec. 15, 2011 International Search Report issued in International Application No. PCT/EP2011/066969 (with translation).
Butts et al., "Silicones", *Encyclopedia of Polymer Science and Technology*, Apr. 15, 2003, vol. 11, pp. 765-841.
Office Action issued in European Application No. 11 767 669.2 issued Feb. 10, 2014 (with translation).
International Preliminary Report on Patentability issued in International Application No. PCT/EP2011/066969 on Apr. 2, 2013 (with translation).

*Primary Examiner* — Ling Choi
*Assistant Examiner* — Catherine S Branch
(74) *Attorney, Agent, or Firm* — Oliff PLC

(57) ABSTRACT

The present invention provides a two-component silicone composition including a component A including at least one polydiorganosiloxane P and a component B, wherein one of the two components A and B additionally includes at least one hydrophobic silica and the other of the two components additionally includes at least one additive selected from the group including polyamine, polyether, heteropolyether and polyetheramine. Application of an inventive composition is accompanied or immediately followed by a rise in the viscosity, such that the composition displays improved initial strength and a lower propensity to slump.

17 Claims, No Drawings

TWO-COMPONENT SILICONE COMPOSITION

TECHNICAL AREA

The present invention relates to the area of two-component silicone compositions.

PRIOR ART

Silicone compositions have long been known and are especially used as adhesives and sealing compositions in various applications. Widespread in this field, in addition to single-component silicone compositions that harden with moisture, also known as RTV-1 silicones (RTV-1: "room temperature vulcanizing, 1-part silicones"), are also two-component silicone compositions that undergo cross-linking at room temperature, also known as RTV-2 silicones (RTV-2: "room temperature vulcanizing, 2-part silicones").

Very frequently for bonding and sealing materials the requirement exists that they should have good strength and, especially in the case of bonds produced in vertical areas, the lowest possible slumping behavior. This requirement is met with the aid of high viscosities for such compositions. One drawback of this procedure lies in the fact that the application of the compositions is made more difficult by the increased viscosity. This is true for both manual and automated application, wherein higher viscosity compositions in particular can only be delivered with difficulty by application devices.

PRESENTATION OF THE INVENTION

Therefore the task of the present invention is that of supplying a two-component silicone composition which can be delivered easily and in which an increase in viscosity takes place with the application or immediately after the application, so that the composition will have improved initial strength and a lower propensity to slump.

This goal is accomplished by means of two-component silicone compositions according to the features of claim 1.

Surprisingly it was found that the viscosity of two-component silicone compositions can be increased in situ, thus during the application of the composition, by mixing its two components using a system consisting of a hydrophobic silica that is used in one of the two components and a specific additive that is contained in the other component.

The present invention shows the advantage that the system used does not cause any unwanted changes in the properties of the silicone composition such as adhesion and mechanical properties. An additional advantage is that the viscosity increase according to the present invention can be adjusted over a broad range.

Additional aspects of the invention are subjects of additional independent claims. Particularly preferred embodiments of the invention are the subject of dependent claims.

METHODS OF EXECUTING THE INVENTION

The subject matter of the present invention is a two-component silicone composition consisting of a component A comprising at least one polydiorganosiloxane P of formula (I),

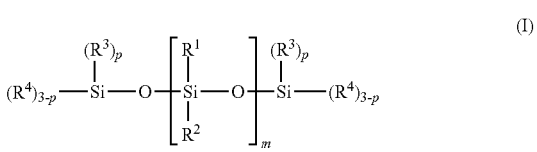

wherein the groups $R^1$, $R^2$, and $R^3$ independently of one another represent linear or branched, monovalent hydrocarbon groups with 1-12 C atoms, which optionally contain one or more hetero atoms and optionally one or more C—C multiple bonds and/or optionally cycloaliphatic and/or aromatic fractions;

the groups $R^4$ independently of one another represent hydroxyl groups or alkoxyl, acetoxy, or ketoxime groups with 1 to 13 C atoms in each case, which optionally contain one or more hetero atoms and optionally one more C—C multiple bonds and/or optionally cycloaliphatic and/or aromatic fractions;

the subscript p represents a value of 0, 1 or 2; and the subscript m is selected such that the polydiorganosiloxane P has a viscosity of 10 to 500,000 mPa·s at a temperature of 23° C.;

and a component B comprising either at least one cross-linking agent for polydiorganosiloxanes; and at least one catalyst for the cross-linking of polydiorganosiloxanes; if p represents a value of 2 and the groups $R^4$ represents hydroxyl groups;

or water, if the groups $R^4$ represent alkoxy, acetoxy or ketoxime groups;

wherein one of the two components A or B additionally contains at least one hydrophobic silica and the other of the two components additionally contains at least one additive selected from the group consisting of polyamine, polyether, heteropolyether and polyetheramine.

Substance names beginning with "poly," for example polyol in the present document, designate substances that formally contain two or more of the functional groups occurring in their name per molecule.

The term "polymer" in the present document on one hand comprises a group of macromolecules that are chemically uniform but differ with regard to degree of polymerization, molecular weight and chain length, produced by polyreactions (polymerization, polyaddition, polycondensation). On the other hand, the term also comprises derivatives of such a collective of macromolecules from polyreactions, thus compounds that were obtained by reactions such as additions or substitutions of functional groups onto preexisting macromolecules and may be chemically uniform or chemically nonuniform. The term also includes so-called prepolymers, in other words reactive oligmeric preadducts, the functional groups of which are involved in the makeup of macromolecules.

"Heteropolyethers" are defined in the present document as polymers with a polyether-analogous structure and hetero atoms, such as S, in place of the ether oxygen atom.

"Molecular weight" in the present document is defined as the mean molecular weight $M_n$ (number-average).

"Room temperature" is defined as a temperature of 23° C.

In the polydiorganosiloxane P of formula (I), which is contained in component A, the radicals $R^1$ and $R^2$ preferably represent alkyl radicals with 1 to 5 C atoms, especially with 1 to 3 C atoms, preferably methyl groups.

Furthermore the subscript m is selected in particular such that the polydiorganosiloxane P has a viscosity of 6,000 to 100,000 mPa·s, preferably of 10,000 to 60,000 mPa·s, at a temperature of 23° C. The viscosity is typically determined according to DIN 53018.

If the polydiorganosiloxane P in component A of the two-component silicone composition is a polydiorganosiloxane terminated with hydroxyl groups, the subscript p represents a value of 2. In this embodiment the component B additionally contains at least one cross-linking agent for polydiorganosiloxanes and at least one catalyst for the cross-linking of polydiorganosiloxanes.

Hydroxyl group-terminated polydiorganosiloxanes are known and are commercially available. The production of such polydiorganosiloxanes is also performed in a known manner. For example, it is described in U.S. Pat. No. 4,962, 152, the disclosure of which is therefore incorporated by reference.

If the polydiorganosiloxane P in component A of the two-component silicone composition is a polydiorganosiloxane P of formula (I), in which the $R^4$ groups represent alkoxy, acetoxy or ketoxime groups, component B additionally comprises water.

In this embodiment the groups $R^4$ preferably represent alkoxy or ketoxime groups. The subscript p especially represents a value of 0 or 1.

Preferred alkoxy groups are methoxy, ethoxy or isopropoxy groups.

Preferred ketoxime groups are dialkylketoxime groups, the alkyl groups of which each contain 1 to 6 C atoms. Preferably the two alkyl groups of the dialkylketoxime groups independently represent methyl, ethyl, n-propyl, isopropyl, n-butyl or isobutyl groups. Particularly preferred are the instances in which one alkyl group of the dialkylketoxime represents a methyl group and the other alkyl group of the dialkylketoxime represents a methyl, ethyl or isobutyl group. Most preferably the ketoxime group is an ethyl-methylketoxime group.

Component A of the two-component silicone composition comprises at least one polydiorganosiloxane P of formula (I), which especially represents a hydroxyl group—terminated polydiorganosiloxane. Preferably the groups $R^1$, $R^2$ and $R^3$ are alkyl radicals with 1 to 3 C atoms, preferably methyl groups. If the polydiorganosiloxane P is a hydroxyl group-terminated polydiorganosiloxane, the subscript p has a value of 2.

If the two-component silicone composition in component B additionally contains a cross-linking agent for polydiorganosiloxanes, this is especially a silane of formula (II).

$$(R^6)_{q}Si(-R^7)_{4-q} \quad (II)$$

Here the group $R^6$, independently of one another, represents a group described previously as $R^3$. Obviously, in this instance $R^6$ is independent of the meaning of $R^6$ in the polydiorganosiloxane P.

The group $R^7$, independently of one another, represents a group that has been described in the preceding as $R^4$. Naturally $R^7$ in this case is independent of the meaning of $R^4$ in the polydiorganosiloxane P. Preferably the group $R^7$ represents alkoxy or ketoxime groups, as were described in the preceding.

Furthermore the subscript q represents a value of 0 to 4, with the specification that if q represents a value of 3 or 4, at least q−2 $R^6$ groups each have at least one group reactive with the hydroxyl, alkoxy, acetoxy or ketoxime groups of the polydiorganosiloxane P. In particular, q represents a value of 0, 1 or 2, preferably a value of 0 or 1.

Examples of suitable silanes of formula (II) are methyltrimethoxysilane, chloromethyltrimethoxysilane, ethyltrimethoxysilane, propyltrimethoxysilane, vinyltrimethoxysilane, methyltriethoxysilane, vinyltriethoxysilane, phenyltriethoxysilane, methyltripropoxysilane, phenyltripropoxysilane, tetramethoxysilane, tetraethoxysilane, tetra-n-propoxysilane, tetra-n-butoxysilane, methyltris(methyl-ethylketoximo)silane, phenyltris(methyl-ethylketoximo)silane, vinyltris(methyl-ethylketoximo)silane, methyltris(isobutylketoximo)silane, or tetra(methyl-ethylketoximo)silane. Particularly preferred are methyltrimethoxysilane, vinyltrimethoxysilane, tetraethoxysilane, methyltris(methyl-ethylketoximo)silane, vinyltris(methyl-ethylketoximo)silane and methyltris(isobutylketoximo)silane. Preferred ketoximosilanes are commercially available from many sources, for example from ABCR GmbH & Co., Germany, or from Nitrochemie AG, Germany.

In addition the silanes can also already exist in partially (some of all $R^7$=OH) or completely (all $R^7$=OH) in hydrolyzed form. Because of the greatly increased reactivity of partially or completely hydrolyzed silanes, their use as cross-linking agents may be advantageous. A person skilled in the art knows that when partially or completely hydrolyzed silanes are used, the formation of oligomeric siloxanes, especially dimers and/or trimers, may occur, as these are formed by condensation of hydrolyzed silanes. Thus oligomeric siloxanes may also be used as cross-linking agents for the two-component silicone composition.

For example, suitable oligomeric siloxanes are hexamethoxydisiloxane, hexaethoxydisiloxane, hexa-n-propoxydisiloxane, hexa-n-butyoxydisiloxane, octaethoxytrisiloxane, octa-n-butyoxytrisiloxane and decaethoxytetrasiloxane.

Naturally, cross-linking agents for polydiorganosiloxanes may also include arbitrary mixtures of the above-mentioned silanes.

The fraction of the cross-linking agent for polydiorganosiloxanes preferably amounts to 0.1 to 15 wt %, especially 1 to 10 wt %, preferably 2 to 6 wt %, of the total two-component silicone compositions.

If the two-component silicone composition in component B also includes a catalyst for the cross-linking of polydiorganosiloxanes, this is especially an organotin compound, a titanate or a combination thereof.

Preferred organotin compounds are dialkyltin compounds, especially as selected from the group consisting of dimethyltin di-2-ethylhexanoate, dimethyltin dilaurate, di-n-butyltin diacetate, di-n-butyltin di-2-ethylhexanoate, di-n-butyltin caprylate, di-n-butyltin di-2,2-dimethyloctanoate, di-n-butyltin dilaurate, di-n-butyltin-distearate, di-n-butyltin dimaleate, di-n-butyltin dioleate, di-n-butyltin diacetate, di-n-octyltin di-2-ethylhexanoate, di-n-octyltin di-2,2-dimethyloctanoate, di-n-octyltin dimaleate and di-n-octyltin dilaurate.

Titanates and organotitanates are the names given to compounds which have at least one ligand bound to the titanium atom via an oxygen atom. Suitable ligands bound to the titanium atom via an oxygen-titanium bond include those which are selected from the group consisting of alkoxy groups, sulfonate groups, carboxylate groups, dialkylphosphate groups, dialkylpyrophosphate groups and acetylacetonate groups. Preferred titanates are, for example, tetrabutyl or tetraisopropyl titanate.

Additional suitable titanates have at least one multidentate ligand, also known as a chelate ligand. In particular the multidentate ligand is a bidentate ligand.

Suitable titanates are commercially available under the trade names Tyzor®AA, GBA, GBO, AA-75, AA-65, AA-105, DC, BEAT, or IBAY from the firm of DuPont, USA.

Naturally it is possible or in certain cases even preferred to use mixtures of various catalysts. An example, of a catalyst is a mixture of an organotin compound with a titanate.

The fraction of the catalyst for cross-linking of polydiorganosiloxanes preferably amounts to 0.001 to 10 wt %, especially 0.005 to 4 wt %, preferably 0.01 to 3 wt %, of the total two-component silicone composition.

The hydrophobic silica is especially a hydrophobic, pyrogenic silica. Typically suitable hydrophobic silicas have a BET surface area in the range of 100 to 300 m²/g. The BET surface area, for example, is determined according to EN ISO 18757.

Suitable hydrophobic silicas can be produced, for example, by making hydrophilic silicas hydrophobic with organosilanes or organosiloxanes. The surface of the hydrophobic silica is chemically modified in the process, i.e., the hydrophobizing agent is connected to the silica by chemical bonds.

Suitable hydrophobizing agents are, for example, octamethylcyclotetrasiloxane, polydimethylsiloxane, dimethyldichlorosilane or hexamethyldisilazane.

Suitable hydrophobic silicas are, for example, commercially available from Evonik Degussa GmbH, Germany, from Cabot Corporation, USA or from Wacker Chemie AG, Germany.

The two-component silicone composition contains at least one additive selected from the group consisting of polyamine, polyether, heteropolyether and polyetheramine. Suitable additives also include derivatives of the compounds mentioned.

In particular the additive also contains at least one functional group of the formula —XH, wherein X represents O, S or NR$^5$ and R$^5$ represents a hydrogen atom or a linear or branched, monovalent hydrocarbon group with 1 to 20 C atoms.

In addition, suitable additives especially have a molecular weight in the range of 100 to 10,000 g/mol.

Preferably the additive is a polyamine or polyetheramine.

Suitable polyamines are especially polyalkyleneimine, such as polyethyleneimine or polypropyleneimine, or alkoxylated polyamine, such as ethoxylated and/or propoxylated ethylenediamine.

Suitable polyetheramines are polyoxyethyleneamine, polyoxypropyleneamine or polyoxyethylene-polyoxypropyleneamine. Particularly preferred polyetheramines are polyether monoamines, polyether diamines or polyether triamines. The amino groups may be primary, secondary or tertiary amino groups. In particular the amino groups are primary or secondary amino groups.

Suitable polyetheramines are commercially available under the trade names of Jeffamine® from Huntsman Corporation, USA. Particularly suitable are Jeffamines® of series M, D, ED, DER, T, SD or ST.

The fraction of the additive preferably amounts to 0.05 to 5 wt %, especially 0.1 to 3 wt %, preferably 0.2 to 1.5 wt %, based on the total two-component silicone composition.

In a preferred embodiment of the two-component silicone composition, the hydrophobic silica is present in component A and the additive in component B.

The particular advantage of this embodiment lies in the fact that component A is usually used in a larger amount compared with component B, and that the viscosity of component A is thus less influenced by the addition of the hydrophobic silica than would be the case with component B.

It has been found that the additive described, together with a hydrophobic silica, has a significant effect on the viscosity of the silicone composition. When used, the hydrophobic silica and the additive lead to a distinct increase in viscosity in each of the two components A and B of the two-component silicone composition, immediately after the two components are mixed.

Typically component A in two-component silicone compositions according to the invention has a viscosity in the range of 500 to 5,000 Pa·s, especially 500 to 3,000 Pa·s. The component B typically has a viscosity in the range of 1 to 1,500 Pa·s, especially of 10 to 700 Pa·s. The adjustment of this viscosity range is generally done by using thickeners and/or fillers, which are typically present in the two components. The viscosity of component A is further influenced by the viscosity of the polydiorganosiloxane P used. For adjusting the viscosity, both component A and component B preferably additionally contain at least one filler.

The viscosity increase brought about the additive together with a hydrophobic silica upon mixing the two components A and B of the two-component silicone composition is especially characterized by the fact that immediately after mixing the two components A and B, the viscosity of the two-component silicone composition rises by ≥100% relative to the initial viscosity of the more highly viscous component, typically component A.

A significant advantage of the present invention lies in the fact that on one hand through the choice of the additive and the hydrophobic silica, and on the other hand through their respective fractions in the corresponding components, the viscosity increase of the two-component silicone composition, which occurs immediately after the mixing of the components A and B, can be adjusted within a very broad range. For example, viscosity increases relative to the initial viscosity of the higher-viscosity component, typically component A, of up to 1,000% or more can be established.

As was previously described, the two-component silicone composition preferably additionally contains at least one filler which influences both the rheologic properties of the non-cured composition and the mechanical properties, along with the surface texture of the cured composition. In particular, the filler is contained in component A.

Suitable fillers are inorganic and organic fillers, for example natural, ground or precipitated calcium carbonates, optionally coated with fatty acids or especially stearic acid; calcined kaolins; aluminum oxide; aluminum hydroxide; silicas, especially highly dispersed silicas from pyrolysis processes; ("carbon black"), especially industrially produced carbon black; aluminum silicates, magnesium-aluminum silicates, zirconium silicates, quartz flour, cristobalite flour, diatomaceous earth, mica, iron oxide, titanium oxide, zirconium oxide, gypsum, annalin, barium sulfate, boron carbide, boron nitride, graphite, carbon fibers, glass fibers or hollow glass beads. Preferred fillers are calcium carbonates, calcined kaolins, carbon black, highly dispersed silicas and flame-retardant fillers such as hydroxides or hydrates, especially hydroxides or hydrates of aluminum, preferably aluminum hydroxide.

Additional fillers that may be used are so-called thickening agents, especially water-soluble or water-swellable polymers or inorganic thickeners. Examples of organic natural thickeners are agar-agar, carrageenan, tragacanth, gum Arabic, alginates, pectins, polyoses, guar flour, starch, dextrins, gelatins or casein. Examples of organic fully or partially synthetic thickeners are carboxymethyl cellulose, cellulose ethers, hydroxy ethyl cellulose, hydroxyl propyl cellulose, poly (meth)acrylic acid derivatives, poly(meth)acrylates, polyvinyl ethers, polyvinyl alcohol or polyamides.

The thickeners described are especially used in component B, when this is present together with a component A comprising a polydiorganoslioxane P in which the $R^4$ groups represent alkoxy, acetoxy or ketoxime groups, i.e., if component B contains water.

It is entirely possible and may even be advantageous to use a mixture of different fillers.

A suitable quantity of filler, for example, falls in the range of 10 to 70 wt %, especially 15 to 60 wt %, preferably 30 to 60 wt %, based on the total two-component silicone composition.

The two-component silicone composition may if desired contain additional constituents.

Such additional constituents are, in particular, plasticizers, curing accelerators, pigments, adhesion promoters, processing aids, rheology modifiers, stabilizers, dyes, inhibitors, heat stabilizers, antistatic agents, flame retardants, biocides, waxes, flow agents, thixotropic agents and additional common raw materials and additives known to persons skilled in the art.

Suitable additional components, especially adhesion agents and plasticizers, which may be present in the two-component silicone composition are described, for example, in paragraphs [0051] to [0055] of patent application US 2010/063190 A1, the total disclosure of which is herewith incorporated by reference.

When such optional components are used it is important to make sure that components which can interfere with the storage stability of the composition by reacting with one another or with other constituents are stored separately from one another.

It is also advantageous to select all of the components optionally present in the two-component silicone composition in such a way that the storage stability of the two components of the two-component silicone composition is not affected negatively by the presence of such a component, i.e., that the composition changes only slightly or not at all in its properties, especially the application and curing properties, during storage. This means that reactions leading to chemical curing of the two-component silicone composition described not take place to a significant extent during storage. In some cases it may be reasonable to physically or chemically dry certain components before mixing them into the composition.

Furthermore the present invention relates to the use of a two-component silicone composition, as described in the preceding, as an adhesive, sealer, coating or casting composition.

In particular the two-component silicone composition according to the invention is suitable for bonding, sealing or coating substrates selected from the group consisting of concrete, mortar, clinker, brick, ceramic, gypsum, natural stones such as granite or marble, glass, glass-ceramic, metal or metal alloys such as aluminum, steel, nonferrous metal, galvanized metal, wood, plastics such as PVC, polycarbonate, polymethyl(meth)acrylate, polyester, epoxy resin, paint and lacquer.

Typically the two-component silicone composition according to the invention is suitable as an adhesive or sealant, especially for applications that require a composition with a good initial strength and a low propensity to swamp. Two-component silicone compositions according to the invention are especially suitable for the construction of windows and façades and for the bonding and sealing of solar panels. Furthermore the two-component silicone composition according to the invention is suitable for use in vehicle construction.

Both component A and component B of the previously-described two-component silicone composition are especially manufactured and stored under exclusion of moisture. The two components are storage-stable separately from one another, in other words, they can be stored for a period of several months up to a year or more in a suitable package or arrangement without their application properties or their properties after curing changing to an extent that would be relevant for their use. The storage stability is usually determined by measuring the viscosity or reactivity over time.

In the application of the two-component silicone composition, components A and B are mixed together, for example by agitation, kneading, rolling, or the like, but especially using a static mixer. In this process the hydroxyl groups or the hydrolyzable groups of the polydiorganosiloxane P come into contact with the hydrolyzable groups or optionally with already hydrolyzed groups of the cross-linking agent, wherein curing of the composition takes place by condensation reactions. Contact of the silicone composition with water, especially in the form of humidity, during applications likewise promotes cross-linking, since reaction of the water with hydrolyzable groups results in formation of more highly reactive silanol groups. The curing of the two-component silicone composition, in particular, is done at room temperature.

In the cross-linking of the two-component silicone composition, byproducts of the condensation reaction that form are especially compounds which do not damage either the composition or the substrate to which the composition is applied. Most preferably the byproducts are compounds which evaporate readily from the cross-linking or already cross-linked composition.

In particular the two-component silicone composition according to the invention is used in such a way that the weight ratio of component A to component B is ≥1:1, especially 3:1 to 15:1, preferably 10:1 to 13:1.

The present invention further relates to a hardened silicone composition obtainable from a two-component silicone composition as described in the preceding by mixing component A with component B.

Furthermore the present invention relates to the use of a hydrophobic silica together with an additive selected from the group consisting of polyamine, polyether, heteropolyether and polyetheramine, to increase the viscosity of two-component silicone compositions, wherein the hydrophobic silica and the additives are each present in one of the two separate components of the two-component silicone compositions, and upon combining the two components, lead to a viscosity increase of at least 100% relative to the initial viscosity of the more highly viscous component of the two-component silicone composition.

Furthermore the present invention relates to a method for increasing the viscosity during the application of two-component silicone compositions consisting of a component A comprising at least one polydiorganosiloxane P, as described in the preceding; and a component B comprising either at least one cross-linking agent for polydiorganosiloxanes; and at least one catalyst for the cross-linking of polydiorganosiloxanes; if p represents a value of 2 and the groups $R^4$ are hydroxyl groups;

or water, if the groups $R^4$ are alkoxy, acetoxy or ketoxime groups;

wherein before application, at least one hydrophobic silica is added to one of the two components A or B and at least one additive selected from the group consisting of polyamine, polyether, heteropolyether and polyetheramine is added to the other of the two components.

The hydrophobic silica is preferably added to component A and the additive to component B.

The viscosity increase begins immediately after the mixing of the two components A and B.

In contrast to the viscosity increase that accompanies the cross-linking of the two-component silicone composition, the viscosity increase caused by combining the hydrophobic silica with the additive does not affect the processability of the composition, i.e., the composition also remains moldable during and after the viscosity increase, for example spreadable.

EXAMPLES

In the following, exemplified embodiments are presented, which are intended to explain the invention described in greater detail. Naturally the invention is not limited to the exemplified embodiments described.

Test Methods

The measurement of the viscosity was done in accordance with DIN 53018 using a Physica MCR101 cone-plate viscometer from the Anton Paar Company, Austria, Cone type CP 25-1, temperature 25° C., shear rate 0.5 s$^{-1}$.

Preparation of Component A1

45 wt % α,ω-dihydroxypolydimethylsiloxane with a viscosity according to DIN 53018 of 50 Pa·s at 23° C., 15 wt % methyl-terminated polydimethylsiloxane with a viscosity according to DIN 50318 of 0.1 Pa·s at 23° C., 30 wt % ground chalk (Carbital™ 110 from Imerys, France) and 10 wt % hydrophobic silica (CAB-O-SIL® TS-530 from Cabot Corporation, USA) were blended together in a SpeedMixer™ DAC 600 mixing device from Hauschild Engineering, Germany, at room temperature, and stirred until a macroscopically homogeneous paste was obtained.

The component A1 produced had a viscosity of 440 Pa·s.

Investigation of Various Additives

Based on the component A1 produced, the viscosity increase upon addition of various additives was determined. For this purpose, different amounts (0.1 to 1.5 wt %) of various additives were added to 100 g component A1 in each case. Component A1 and the additive were blended with a spatula and then mixed in a SpeedMixer™ DAC 600 for 20 seconds at 2200 rpm. Immediately after mixing, the viscosity of the paste obtained was measured.

The measured viscosities for different amounts of various additives are shown in Table 1.

TABLE 1

Viscosities of component A1 after addition of various quantities of different additives; a) available from Sigma-Aldrich, Switzerland; b) available from BASF SE, Germany.

| | Viscosity [Pa · s] Fraction of additive to A1 [wt %] | | | | |
|---|---|---|---|---|---|
| | 0.1 | 0.3 | 0.5 | 1.0 | 1.5 |
| Polyethylenimine with ethylenediamin end groups (M$_n$ 600)$^{a)}$ | | | 14680 | 8242 | 6801 |
| Jeffamine ® D-400 | 3081 | 14590 | 13500 | 7864 | 6828 |
| Jeffamine ® M-600 | 2081 | 13350 | 11450 | 9408 | 7539 |
| Jeffamine ® T-3000 | 2443 | 7427 | 10140 | 11220 | 9886 |
| Jeffamine ® SD-401 | 1934 | 10600 | 8898 | 6944 | 4134 |
| Jeffamine ® D-2000 | 2649 | 8402 | 8793 | 10090 | 9021 |

TABLE 1-continued

Viscosities of component A1 after addition of various quantities of different additives; a) available from Sigma-Aldrich, Switzerland; b) available from BASF SE, Germany.

| | Viscosity [Pa · s] Fraction of additive to A1 [wt %] | | | | |
|---|---|---|---|---|---|
| | 0.1 | 0.3 | 0.5 | 1.0 | 1.5 |
| Jeffamine ® SD-2001 | | | 6943 | 7215 | 7221 |
| Tetronic ® 701$^{b)}$ | | | 3223 | 3893 | 4564 |
| Pluronic ® L-61$^{b)}$ | | | 2762 | 3410 | 4246 |
| Tetronic ® 90R4$^{b)}$ | | | 2511 | 3080 | 3747 |
| Polyethylene glycol (M$_n$ 380-420)$^{a)}$ | | | 1811 | 1937 | 2128 |

Preparation of Component A2

50 wt % α,ω-dihydroxypolydimethylsiloxane with a viscosity according to DIN 53018 of 50 Pa·s at 23° C., 17 wt % methyl-terminated polydimethylsiloxane with a viscosity according to DIN 50318 of 0.1 Pa·s at 23° C. and 30 wt % ground chalk (Carbital™ 110) were blended together in a dissolver at room temperature, and stirred until a macroscopically homogeneous paste was obtained.

To 100 g of each of the mixtures produced, different amounts of various silicas were added, so that a fraction of the respective silica relative to component A2 of 1, 3, 5, 10 or 15 wt % resulted. The silicas were mixed in using a SpeedMixer™ DAC 600 mixer for 20 seconds at 2200 rpm; mixing was repeated three times.

The measured viscosities of the components A2 produced are presented in Table 3.

Investigation of Various Silicas

Based on the component A2 produced, the viscosity increase produced using various silicas was determined.

For this purpose, 0.5 wt % of the additive was added to 100 g of the different components A2. The respective component A2 and the additive were blended with a spatula and then mixed in a SpeedMixer™ DAC 600 for 20 seconds at 2200 rpm. Immediately after mixing, the viscosity of the paste obtained was measured.

The measured viscosities at different amounts of various additives are shown in Table 3.

The following silicas were investigated:

TABLE 2

Silicas invesigated

| Trade name | Supplier | Hydrophobic treatment |
|---|---|---|
| Aerosil ® R106 | Evonik Degussa GmbH, Deutschland | Octamethylcyclotetrasiloxane |
| Aerosil ® R202 | | Polydimethylsiloxane |
| Aerosil ® R972 | | Dimethyldichlorosilane |
| Aerosil ® 150 | | None |
| CAB-O-SIL ® TS-530 | Cabot Corporation, USA | Hexamethyldisilazane |

TABLE 3

Viscosities of component A2 with different silicas without additive (reference) and after addition of 0.5 wt % in each case of different additives.

| | Viscosity [Pa · s] Fraction of silica in A2 [wt %] | | | | |
|---|---|---|---|---|---|
| | 1 | 3 | 5 | 10 | 15 |
| | No additive (reference) | | | | |
| Aerosil ® R106 | 139 | 202 | 367 | 8220 | |
| Aerosil ® R202 | 179 | 258 | 438 | 4650 | |
| Aerosil ® R972 | 189 | 244 | 413 | 3016 | |
| CAB-O-SIL ® TS-530 | | | 167 | 341 | 1402 |
| Aerosil ® 150 | | 299 | 767 | | |
| | Additive: 0.5 wt % Jeffamine ® D-2000 | | | | |
| Aerosil ® R106 | 180 | 998 | 4344 | 21110 | |
| Aerosil ® R202 | 155 | 425 | 1253 | 13850 | |
| Aerosil ® R972 | 134 | 351 | 1250 | 15250 | |
| CAB-O-SIL ® TS-530 | | | 737 | 7360 | 17460 |
| Aerosil ® 150 | | 201 | 610 | | |
| | Additive: 0.5 wt % Jeffamine ® SD-2001 | | | | |
| Aerosil ® R106 | 210 | 793 | 3639 | 21110 | |
| Aerosil ® R202 | 168 | 348 | 1219 | 12290 | |
| Aerosil ® R972 | 163 | 343 | 1241 | 13940 | |
| CAB-O-SIL ® TS-530 | | | 558 | 4942 | 11270 |
| Aerosil ® 150 | | 218 | 497 | | |

The invention claimed is:

1. A two-component silicone composition consisting of:
a component A comprising:
at least one polydiorganosiloxane P of formula (I),

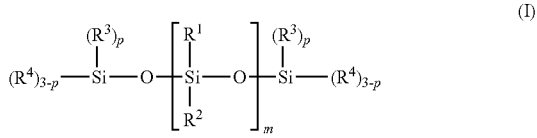

the groups $R^1$, $R^2$, and $R^3$ independently of one another represent linear or branched, monovalent hydrocarbon groups with 1-12 C atoms, the groups optionally containing one or more hetero atoms and optionally at least one of one or more C—C multiple bonds, cycloaliphatic fractions and aromatic fractions;

$R^4$ is a hydroxyl group or a non-hydroxyl group with 1 to 13 C atoms selected from the group consisting of an alkoxyl group, an acetoxy group and a ketoxime group, the non-hydroxyl group optionally containing one or more hetero atoms and optionally at least one of one or more C—C multiple bonds, cycloaliphatic fractions and aromatic fractions;

the subscript p represents a value of 0, 1 or 2; and
the subscript m is selected such that the polydiorganosiloxane P has a viscosity of 10 to 500,000 mPa·s at a temperature of 23° C.; and a component B comprising:
(1) at least one cross-linking agent for polydiorganosiloxanes and at least one catalyst for the cross-linking of polydiorganosiloxanes, if $R^4$ is the hydroxyl group; or
(2) water, if $R^4$ is the non-hydroxyl group,
wherein p represents a value of 2 when $R^4$ is the hydroxyl group, and one of the two components A or B additionally contains at least one hydrophobic silica and the other of the two components additionally contains at least one additive selected from the group consisting of polyamine, polyether, heteropolyether and polyetheramine.

2. The two-component silicone composition according to claim 1, wherein the at least one hydrophobic silica is present in component A and the additive in component B.

3. The two-component silicone composition according to claim 1, wherein the fraction of hydrophobic silica is in the range of 1 to 15 wt %, based on the total two-component silicone composition.

4. The two-component silicone composition according to claim 1, wherein the additive is polyetherdiamine or polyethertetramine.

5. The two-component silicone composition according to claim 4, wherein the additive is polyethermonoamine, polyetherdiamine or polyethertetramine.

6. The two-component silicone composition according to claim 1, wherein the additive contains at least one primary or secondary amino group.

7. The two-component silicone composition according to claim 1, wherein the fraction of additive is in the range of 0.05 to 5 wt %, based on the total two-component silicone composition.

8. The two-component silicone composition according to claim 1, wherein component A and component B additionally each contain at least one filler.

9. The two-component silicone composition according to claim 1, wherein component A has a viscosity in the range of 500 to 5000 Pa s and component B has a viscosity in the range of 1 to 1500 Pa s and wherein the viscosity of the two-component silicone composition immediately after mixing of the two components A and B increases by at least 100% relative to the initial viscosity of the component with the higher viscosity.

10. The two-corn ent silicone composition according to claim 1, wherein the weight ratio of component A to component B is is 1:1 or greater.

11. An adhesive comprising the two-component silicone composition according to claim 1.

12. A cured silicone composition obtained from the two-component silicone composition according to claim 1 by mixing component A with component B.

13. A method for increasing the viscosity of a two-component silicone composition, the method comprising:
utilizing a hydrophobic silica together with at least one additive selected from the group consisting of polyamine, polyether, heteropolyether and polyetheramine, the hydrophobic silica and the additive are each present in one of the two separate components of the two-component silicone composition according to claim 1; and
combining the two components,
wherein upon combining the two components, a viscosity of the two-component silicone composition increases at least 100% relative to an initial viscosity of the higher-viscosity component of the two-component silicone composition.

14. A process for increasing the viscosity in the application of a two-component silicone composition, the process comprising:
applying a two-component silicone composition, the composition consisting of:
a component A comprising
at least one polydiorganosiloxane P of formula (I),

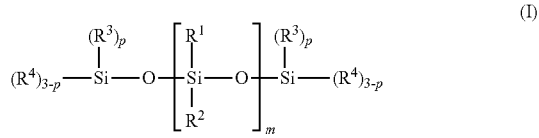

(I)

the groups $R^1$, $R^2$, and $R^3$ independently of one another represent linear or branched, monovalent hydrocarbon groups with 1 to 12 C atoms, the groups optionally containing one or more hetero atoms and optionally at least one of one or more C—C multiple bonds, cycloaliphatic fractions and aromatic fractions;

$R^4$ is a hydroxyl group or a non-hydroxyl group with 1 to 13 C atoms selected from the group consisting of an alkoxyl group, an acetoxy group and a ketoxime group, the non-hydroxyl group optionally containing one or more hetero atoms and optionally at least one of one or more C—C multiple bonds, cycloaliphatic fractions and aromatic fractions;

the subscript p represents a value of 0, 1 or 2; and the subscript m is selected such that the polydiorganosiloxane P has a viscosity of 10 to 500,000 mPa·s at a temperature of 23° C.; and a component B comprising:
(1) at least one cross-linking agent for polydiorganosiloxanes and at least one catalyst for the cross-linking of polydiorganosiloxanes, if $R^4$ is the hydroxyl group; or
(2) water, if $R^4$ is the non-hydroxyl group,
wherein p represents a value of 2 when $R^4$ is the hydroxyl group;

adding at least one hydrophobic silica to one of the two components A or B before application; and adding at least one additive selected from the group consisting of polyamine, polyether, heteropolyether and polyetheramine to the other of the two components before application.

15. A sealant comprising the two-component silicone composition according to claim 1.

16. A coating comprising the two-component silicone composition according to claim 1.

17. A casting composition comprising the two-component silicone composition according to claim 1.

* * * * *